United States Patent
Fournier

(10) Patent No.: US 9,062,752 B2
(45) Date of Patent: Jun. 23, 2015

(54) PARK RELEASE APPARATUS FOR A TRANSMISSION

(71) Applicant: Walter L. Fournier, Rochester Hills, MI (US)

(72) Inventor: Walter L. Fournier, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 114 days.

(21) Appl. No.: 13/868,178

(22) Filed: Apr. 23, 2013

(65) Prior Publication Data

US 2014/0311269 A1    Oct. 23, 2014

(51) Int. Cl.
*F16H 59/02*    (2006.01)
*F16H 63/34*    (2006.01)

(52) U.S. Cl.
CPC .......... *F16H 59/0278* (2013.01); *Y10T 74/2014* (2015.01); *F16H 63/3416* (2013.01)

(58) Field of Classification Search
CPC .......................... F16H 63/3416; Y10T 4/2014
See application file for complete search history.

(56) References Cited

U.S. PATENT DOCUMENTS

| | | | |
|---|---|---|---|
| 5,992,264 A | 11/1999 | Brock, Sr. | |
| 8,266,981 B2 | 9/2012 | Gordy | |
| 8,276,477 B2 | 10/2012 | Lavezzi et al. | |
| 8,312,788 B2 | 11/2012 | Kwon | |
| 2005/0236251 A1* | 10/2005 | Yamamoto | 192/219.4 |
| 2010/0275715 A1 | 11/2010 | Ruhlander | |
| 2012/0272780 A1 | 11/2012 | Schimings et al. | |
| 2013/0020171 A1* | 1/2013 | Jang et al. | 192/220.2 |
| 2014/0326101 A1* | 11/2014 | Han et al. | 74/502.2 |

* cited by examiner

*Primary Examiner* — William Kelleher
*Assistant Examiner* — Terence Boes
(74) *Attorney, Agent, or Firm* — Ralph E Smith

(57) ABSTRACT

An apparatus for manually shifting an automatic transmission can include a lever assembly, a coupling member and a lock arrangement. The lever assembly can include a variable length lever. The coupling member can be connected at a first end to the lever assembly and can be adapted to be coupled at a second end to a shift lever of the transmission. The lock arrangement can be associated with the lever assembly, and can be configured to provide for selective movement of the variable length lever between a stowed position having a first length and a deployed position having a second length greater than the first length. Actuation of the lever assembly can be adapted to move the shift lever to manually release a parking lock of the automatic transmission.

10 Claims, 5 Drawing Sheets

PARK RELEASE APPARATUS FOR A TRANSMISSION

FIELD

The present disclosure relates generally to a shaft apparatus for a transmission and, more particularly, to a park release apparatus for an electronically controlled transmission.

BACKGROUND

Today's automotive vehicles can include electronic or shift-by-wire automatic transmissions where shifting commands from a park-reverse-neutral-drive shift lever are transmitted to the transmission by electric or electronic signals. With such transmissions, a mechanical device can be used to manually shift the transmission out of park if vehicle electrical power is lost. Vehicles with a large mass and/or vehicles parked on grades can place greater force on the transmission in the park state, which can require greater force to be exerted by the mechanical device to manually release the transmission from park for such vehicles. The mechanical devices can be positioned inside the vehicle near the driver, and are designed to be minimal in size to conserve space for other vehicle control devices and features. Thus, there remains a need for improvement in the relevant art for a park release system for an electronically controlled or shift-by-wire automatic transmission for a vehicle.

SUMMARY

In one form, an apparatus for manually shifting an automatic transmission is provided in accordance with the teachings of the present disclosure. The apparatus can include a lever assembly, a coupling member and a lock arrangement. The lever assembly can include a variable length lever. The coupling member can be connected at a first end to the lever assembly and can be adapted to be coupled at a second end to a shift lever of the transmission. The lock arrangement can be associated with the lever assembly, and can be configured to provide for selective movement of the variable length lever between a stowed position having a first length and a deployed position having a second length greater than the first length. Actuation of the lever assembly can be adapted to move the shift lever to manually release a parking lock of the shift-by-wire automatic transmission.

In another form, an apparatus for manually shifting a shift-by-wire automatic transmission is provided in accordance with the teachings of the present disclosure. The apparatus can include a base, a variable length lever assembly, a coupling member and a lock arrangement. The variable length lever assembly can be pivotably coupled to the base and can include first and second lever arms slidably coupled to each other. The coupling member can be connected at a first end to the variable length lever assembly and can be adapted to be coupled at a second end to a shift lever of the transmission. The lock arrangement can be associated with the variable length lever assembly. The lock arrangement can be configured to provide for selective movement of one of the first or second lever arms relative to the other of the first and second lever arms between a stowed position where the variable length lever assembly has a first length and a deployed position where the variable length lever assembly has a second length greater than the first length. The lock arrangement can be configured to selectively maintain the one of the first and second lever arms in the stowed and deployed positions. Actuation of the variable length lever assembly can be adapted to move the shift lever to manually release a parking lock of the shift-by-wire transmission.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
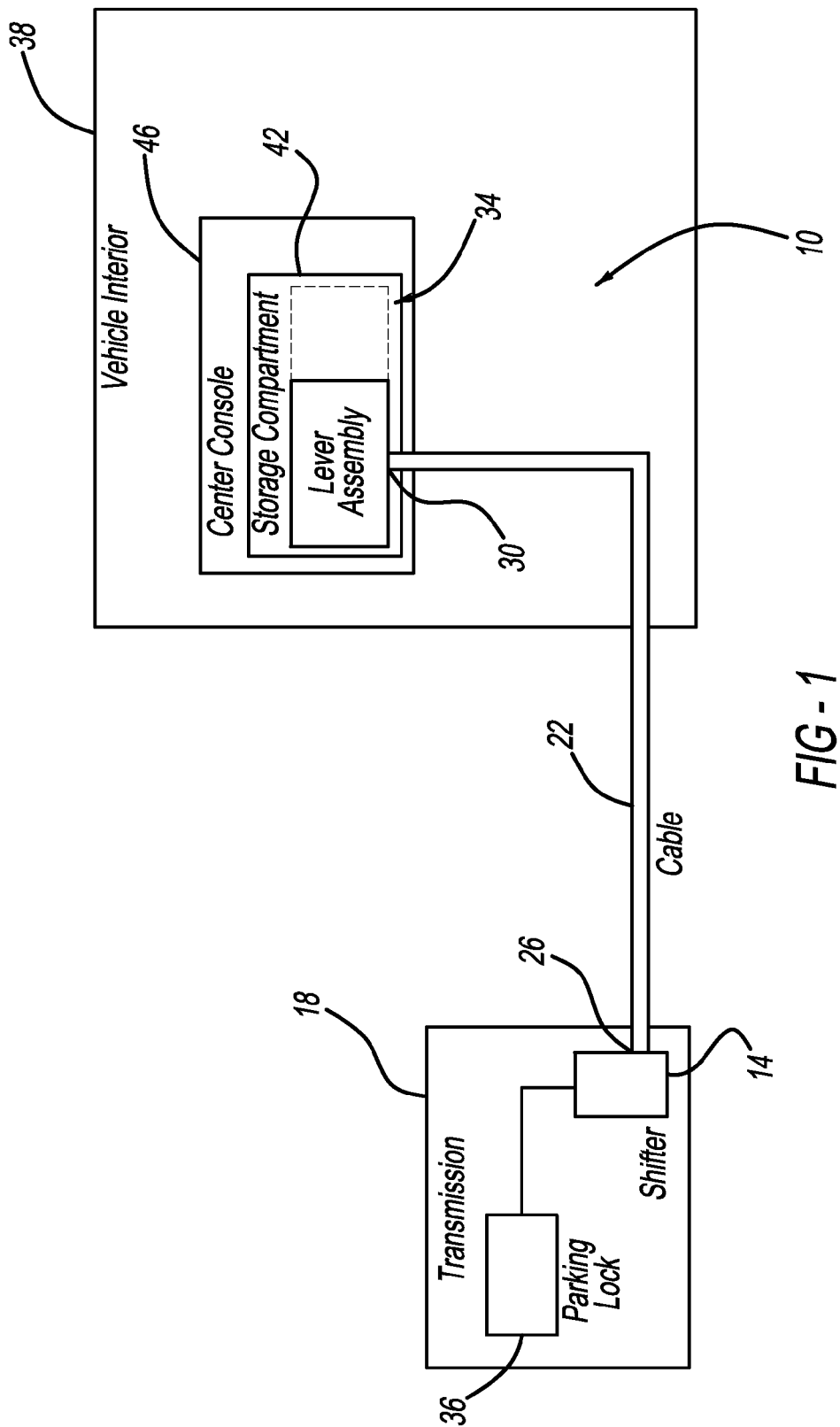
FIG. 1 is a schematic illustration of an exemplary park release system for a transmission according to the principles of the present disclosure.

With initial reference to FIG. 1, a schematic representation of a park release system 10 for a transmission of a vehicle is shown. In one exemplary configuration, the park release system 10 can be provided for an electronically controlled or shift-by-wire transmission where shifting of the transmission gears is accomplished electronically or substantially electronically. As briefly discussed above, such shift-by-wire transmissions can become fixed in a park state (e.g., the transmission fixed in park gear or with the parking lock engaged) in the event electrical power for the vehicle is disrupted for a period of time and/or lost. Electrical power can be lost or disrupted, for example, in an emergency situation or when a vehicle is being serviced at a dealership. A manually operated release can be utilized to release the transmission from its park state when electrical power is unavailable and the vehicle is required to be moved, such as for towing or servicing.

With continued reference to FIG. 1, the park release system 10 can be associated with a transmission shifter, such as a shift lever 14, of an electronically controlled or shift-by-wire transmission 18 via a cable or other coupling/mechanical connection 22. For ease of reference, the discussion will continue with reference to the electronically controlled or shift-by-wire transmission 18 as "transmission 18". A first end 26 of cable 22 can be coupled to the transmission shift lever 14 and a second opposite end 30 can be coupled to variable length lever assembly 34 of park release system 10. The transmission shift lever 14 can be coupled to a parking lock 36.

In the exemplary configuration illustrated, the lever assembly 34 can be positioned remote from the transmission 18, such as in an interior 38 of a vehicle (not specifically shown). Positioning the lever assembly 34 in the interior 38 can provide for restricting or limiting access to the lever assembly 34 while the vehicle is locked, for example. It may also be desirable to position the lever assembly 34 in a covered or not easily visible location in the interior 38, such as in a cubby hole of an instrument panel or a storage compartment 42 of a center console 46. It should be appreciated, however, that while the discussion will continue with reference to positioning the lever assembly 34 in the center console 46, the lever assembly 34 could be positioned in various areas of interior 38 and/or other enclosed areas of the vehicle, such as a trunk or engine compartment.

As can be appreciated, available space in a cubby hole or the storage compartment 42 can be limited as a result of typical efforts to maximize storage space in the interior 38 of the vehicle. As a result, there can be packaging and manufacturing assembly constraints associated with installing lever assembly 34 in the storage compartment 42, such that a smaller lever assembly would be required or at least advantageous for the installation process. Further, if the lever assembly 34 is positioned in the storage compartment 42 in an area typically utilized for storage, it may also be desirable to minimize a size of the lever assembly 34 to maximize usable storage space.

As will be discussed in greater detail below, the lever assembly 34, according to various aspects of the present teachings, can include a variable length handle or lever. The variable length lever can facilitate ease of assembly into the vehicle and minimize required space for packaging (e.g., storage space) while being selectively expandable to increase mechanical advantage when desired for use to manually release the transmission parking lock 36.

With additional reference to FIGS. 2-6 and continuing reference to FIG. 1, the lever assembly 34 can include a base 54, a lever arm assembly 58, a first locking device 62 and a second locking device 66. The base 54 can include a generally rectangular shape 70 having a length 74 and width 78 greater than a corresponding length and width of the lever arm assembly 58. It should be appreciated, however, that the base 54 can be configured in various different shapes and lengths as may be desired, for example, for a particular vehicle application. Base 54 can include a first end 82, a second opposed end 88, opposed lateral sides 92, an upper surface 96 and an opposed lower surface 102.

In one exemplary configuration, base 54 can include one or more attachment configurations, such as one or more J-clips 106 and/or one or more apertures 110 configured to receive corresponding fasteners (not shown). In a configuration provided with one or more apertures 110, a threaded fastener and/or push-pin fastener (not shown) could be utilized to secure the lever assembly 34 to the vehicle. Base 54 can also include an aperture 114 having an optionally angled sidewall 118 for receiving cable 22 therethrough.

Figure 6:
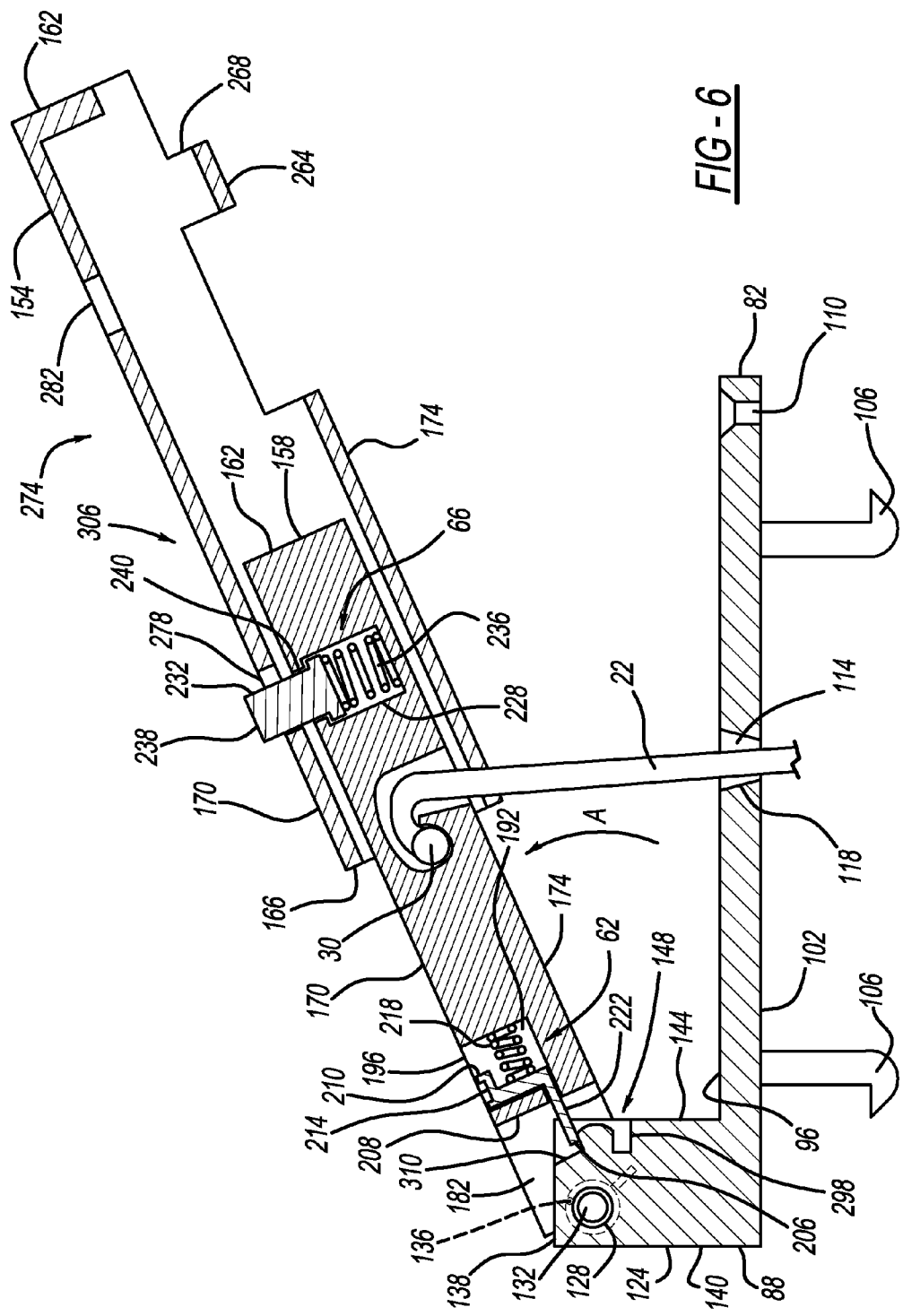
FIG. 6 is a view of the park release lever assembly shown in FIG. 5 rotated about a pivot axis to a release position according to the principles of the present disclosure.

A pivot block 124 can extend from the upper surface 96 at or proximate the second end 88. The pivot block 124 can be integrally formed with the base 54 or can be a separate element coupled to the base 54. In one exemplary configuration, pivot block 124 can replace base 54 and be coupled to the vehicle in the manner discussed above for base 54. Pivot block 124 can include an aperture 128 configured to receive a pivot pin 132 to rotatably or pivotably couple the lever arm assembly 58 to the pivot block 124. A biasing device, such as a coil spring 136, can be coupled to the pivot block 124 and the lever arm assembly 58. As will be discussed in greater detail below, the coil spring 136 can be configured to bias the lever arm assembly 58 in a direction toward a release position (FIG. 6). Pivot block 124 can include an upper end 138, a first end 140 at or facing the second end 88 and a second opposed end 144. The second opposed end 144 can include a lock coupling area 148 configured to cooperate with the first locking device 62, as will be discussed in greater detail below.

The lever arm assembly 58 can include a first or outer lever arm 154 and a second or inner lever arm 158. The outer and inner lever arms 154, 158 can each include a first end 162, a second opposed end 166, an upper side 170 and an opposed lower side 174. In the exemplary configuration illustrated, the inner lever arm 158 can be pivotably coupled to the pivot block 124 via pivot pin 132, and the outer lever arm 154 can be selectively slidable relative to the inner lever arm 158, as will be discussed in greater detail below. In this exemplary configuration, the coil spring 136 can be coupled to the inner lever arm 158. It should be appreciated that while the discussion will continue with reference to the inner lever arm 158 being pivotably coupled to the base 54 and the outer lever arm 154 being slidable relative to the inner lever arm 158, the lever arms 154, 158 could also be oppositely configured such that the outer lever arm 154 is pivotably coupled to base 54 and the inner lever arm 158 is slidable relative to the outer lever arm 154.

In the exemplary configuration illustrated, the inner lever arm 158 can include a substantially rectangular shape and a forked end 182 forming the first end 162. The forked end 182 can include a pair of spaced apart extending members 186 configured to be positioned about opposed sides of the pivot block 124, as shown for example in FIG. 1 with reference to FIG. 2. It should be appreciated, however, that the inner lever arm 158 can be pivotably coupled to the pivot block 124 or base 54 in various manners, including the pivot block 124 having the forked configuration 182 that is configured to receive an extending member from the first end 162 of the inner lever arm 158.

The inner lever arm 158 can include a cavity or depression 192 positioned proximate the first end 162 and accessible via an opening 196 from the upper side 170. In the exemplary configuration illustrated, the cavity 192 can movably house the first locking device 62. In one exemplary configuration, the first locking device 62 can include a lock member 202 having a first end 206 configured to protrude from an end area 208 and a second end 210 having an actuation area 214 positioned adjacent or near the opening 196. The lock member 202 can be biased with a biasing member 218 to a first position 222 shown in FIG. 4 where the first end 206 of the lock member 202 protrudes from the end area 208 of inner lever arm 158.

Figure 4:
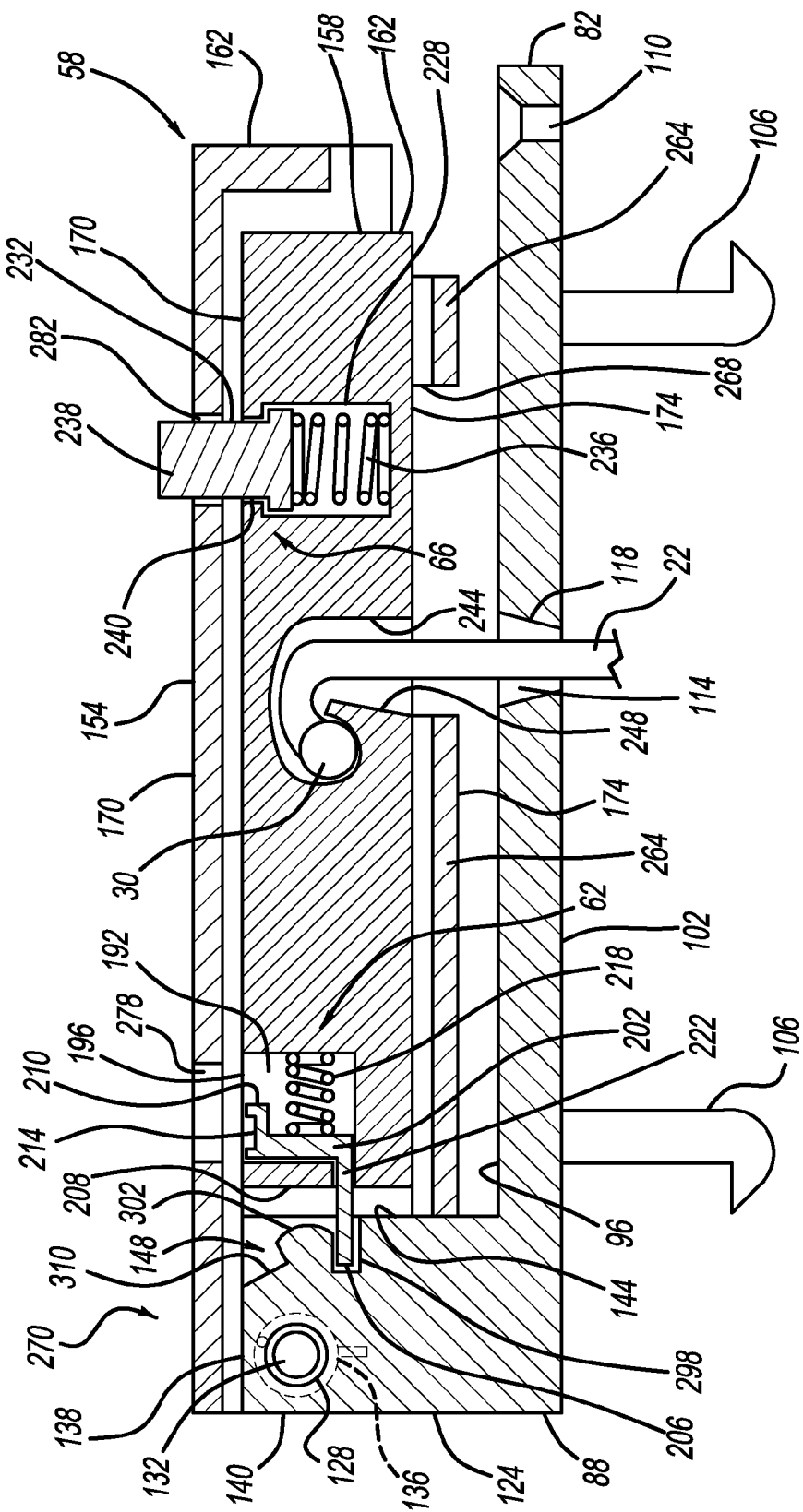
FIG. 4 is a section view of the park release lever assembly along line 4-4 of FIG. 2 according to the principles of the present disclosure.
Figure 5:
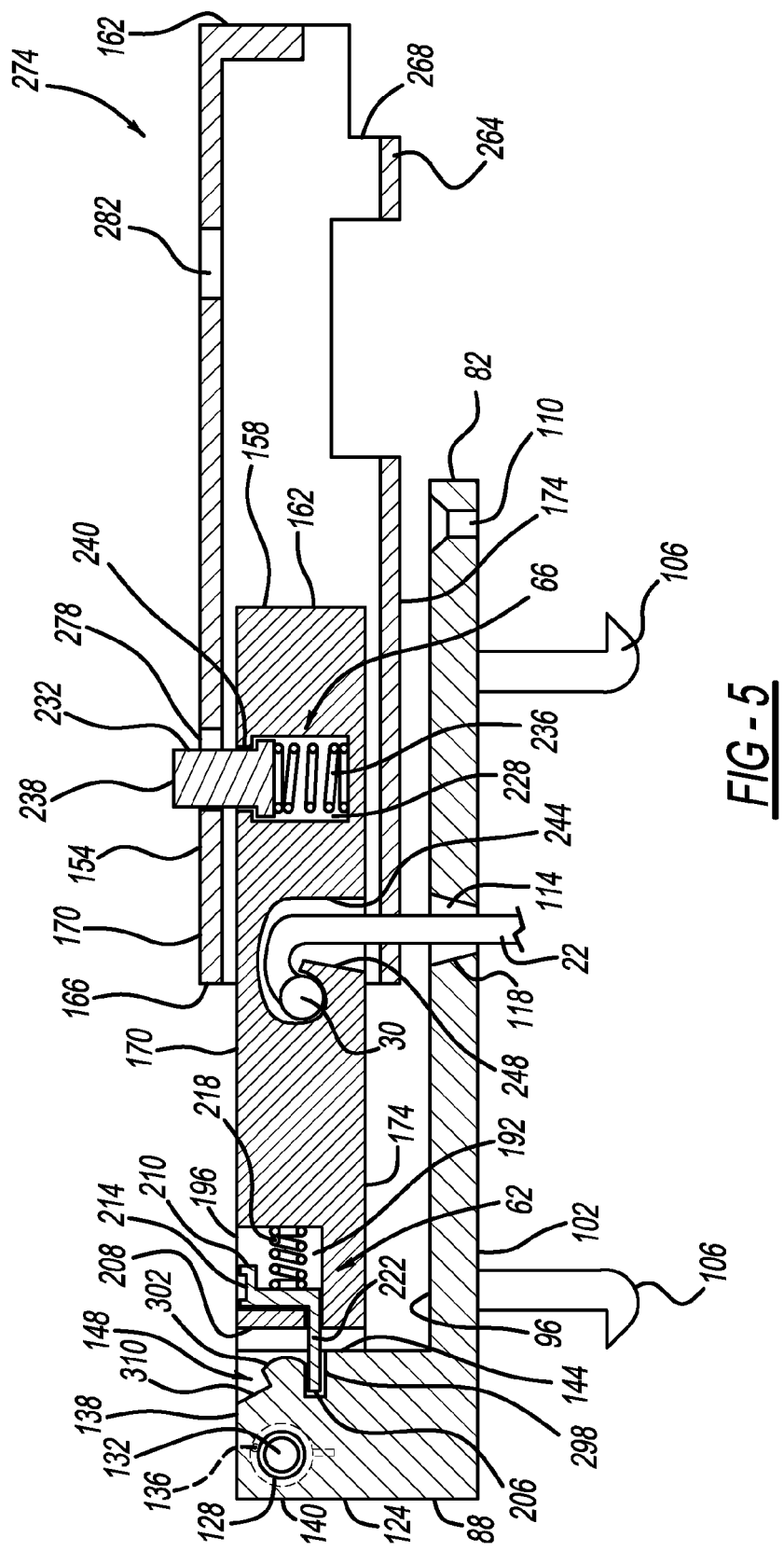
FIG. 5 is view of the park release lever assembly shown in FIG. 4 with a lever arm in an extended position according to the principles of the present disclosure.

The first end 206 of lock member 202 can be configured to engage the lock coupling area 148 of pivot block 124, as shown for example in FIGS. 4-6. It should be appreciated that while the discussion will continue with reference to the illustrated lock coupling area 148 and first locking device 62, other locking arrangements could be utilized and/or the lever assembly 34 could alternatively be implemented without the first locking device 62 and associated cavity 192 and lock coupling area 148.

Inner lever arm 158 can also include a second cavity or depression 228 sized and shaped to movably house the second locking device 66. In one exemplary configuration, the second locking device 66 can include a lock member 232 biased by a biasing member 236 to have a first end 238 extend through an opening 240 of cavity 228 formed adjacent the upper side 170. In the exemplary configuration illustrated in the various figures, the lock member 232 can be a lock pin biased by biasing member 236 in the form of a spring. It should be appreciated, however, that other selectively displaceable locking devices could be utilized with lever assembly 34.

An attachment cavity or retaining channel 244 can be formed in the inner lever arm 158 and can be configured to receive the second end 30 of cable 22 to secure cable 22 thereto. In the exemplary configuration illustrated, channel 244 can be open to the lower side 174 of inner lever arm 158 and can include an angled sidewall 248 to facilitate unobstructed movement of cable 22 with pivoting of lever arm assembly 58 relative to base 54. It should be appreciated that while cable 22 is shown as being coupled to inner lever arm 158 via retaining channel 244, other attachment configurations, such as with a fastener, are envisioned.

Figure 2:
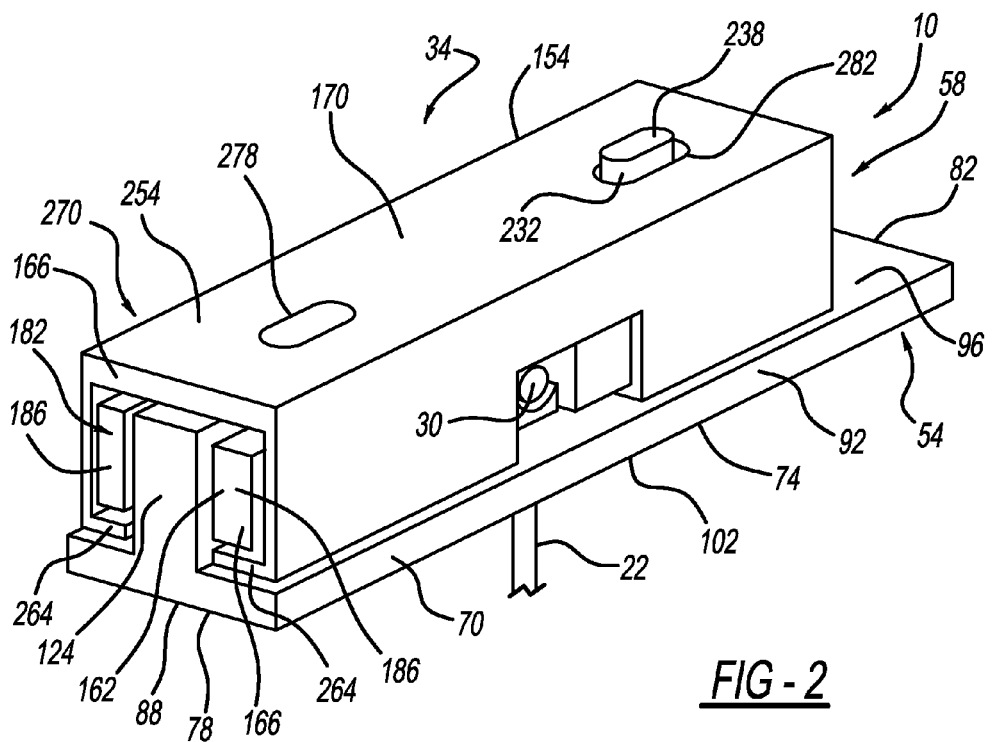
FIG. 2 is a perspective view of an exemplary park release lever assembly according to the principles of the present disclosure.

The outer lever arm 154 can include a U-shape or a substantial U-Shape 254 so as to surround or substantially surround the upper side 170 and opposed sides 260 of inner lever arm 158, as shown for example in FIGS. 2 and 4. In the exemplary configuration illustrated, the outer lever arm 154 can include retaining lips or flanges 264 extending from free ends 268 of the U-shape 254 so as to slidably engage the lower side 174 of inner lever arm 158. The U-shape 254 together with the flanges 264 can slidably capture the inner lever arm 158 such that it telescopically nests within or substantially within outer lever arm 154, as also shown in FIGS. 2 and 4. As will be discussed in greater detail below, outer lever arm 154 can be selectively slidably extended from a first or stowed position 270 shown in FIGS. 2-4 to a second or deployed position 274 shown in FIGS. 5-6.

Figure 3:
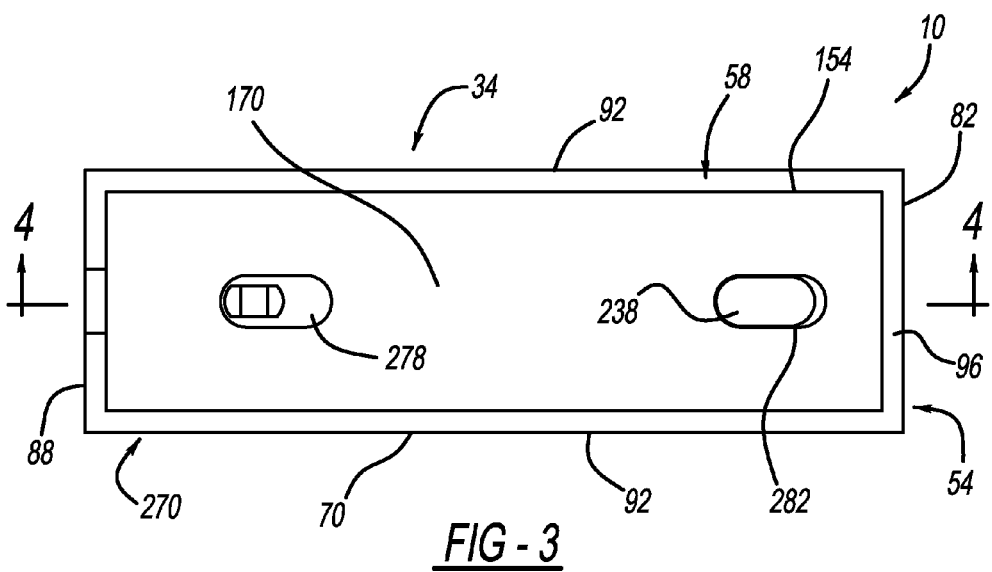
FIG. 3 is a top view of the park release lever assembly of FIG. 2 according to the principles of the present disclosure.

The upper side 170 of outer lever arm 154 can include first and second lock engagement positions, such as apertures 278, 282 shown for example in FIGS. 2-4. The first and second apertures 278, 282 can correspond in location to the respective first and second locking devices 62, 66 when the outer lever arm 154 is in the stowed position 270, as shown for example in FIG. 4. In the exemplary configuration illustrated in the various figures, the first aperture 278 can align or substantially align with the opening 196 of cavity 192 and the second aperture 282 can align with the opening 240 of cavity 228 when the outer lever arm 154 is in the stowed position 270. Apertures 278, 282 can provide access through the outer lever arm 154 to the respective lock members 202, 232 via a tool or other actuation member (not shown) sized and shaped to fit through the apertures.

As discussed above, the outer lever arm 154 can slide relative to the inner lever arm 158 to increase an overall length of the lever arm assembly 58. Increasing the length of the lever arm assembly 58 can increase the mechanical advantage thereby requiring less effort for a user to pull the lever arm assembly 58 upward relative to base 54 to manually shift/release the transmission out of park (e.g., release the parking lock 36).

The second locking device 66 can selectively maintain the outer lever arm 154 in the stowed position 270, as can be seen for example in FIG. 4. In particular, the first end 238 of lock member 232 can extend into second aperture 282. A tool or other actuation device can be used to engage the first end 238 of lock member 232 to depress lock member 232 toward a bottom of cavity 228 in a direction toward base 54. This action can release outer lever arm 154 to be axially extended from the stowed position 270 shown in FIG. 4 to the deployed position 274 shown in FIG. 5.

As the outer lever arm 154 travels from the stowed position 270 toward the deployed position 274, the second aperture 282 will no longer be aligned with the lock member 232. However, the spring 236 can bias or urge the lock member 232 into sliding engagement with an underside 288 of the outer lever arm 154 as the outer lever arm 154 is extended toward the deployed position 274. When the first aperture 278 is in alignment with the lock member 232, the spring 236 can cause the lock member 232 to extend into the first aperture 278 thereby securing or locking the outer lever arm 154 in the deployed position 274 shown in FIG. 5.

In operation, the lever assembly 34 can be utilized to manually release a parking lock 36 of a shift-by-wire transmission in various circumstances, including a situation where the vehicle experiences a loss of electrical power. The lever assembly 34 can be packaged in a hidden or covered area of a vehicle interior, including in a storage compartment, due to its compact size and the variable length lever.

In a situation where the transmission parking lock 36 is required to be manually released, a tool or other actuation device can be utilized to actuate or release the lock member 232 of the second locking device 66. Outer lever arm 154 can then be extended from the stowed position 270 to the deployed position 274, upon which the lock member 232 can automatically extend into and/or engage the second aperture 282. The first locking device 62 can then be actuated/released with the same or another actuation device. In one exemplary aspect, the actuation device can be a vehicle key. It should be appreciated, however, that the first locking device 62 could alternatively be actuated/released before the second locking device 66.

The first locking device 62 can be released by engaging an actuation area 214 at the second end 210 of lock member 202. The lock member 202 can be translated against the biasing force of spring 218 to release second end 210 from a first detent 298 in lock coupling area 148. Spring 136 can aid in urging lever arm assembly 58 upward in the rotational direction of arrow A such that first end 206 of lock member 202 engages cam surface area 302. A user or vehicle occupant can then manually raise/pivot the extended lever arm assembly 58 in the direction of arrow A to move cable 22 and cause shift lever 14 to release the parking lock 36. Lever arm assembly 58 can be pivoted about pivot pin 132 to a release position 306 (FIG. 6) upon which the first end 206 of lock member 202 can engage a second detent 310.

The engagement of lock member 202 with second detent 310 can maintain the lever arm assembly 58 in the release position 306 until the first locking device 62 is again actuated to release lock member 202 from second detent 310. This can prevent an unwanted shifting of the transmission parking lock 36 from a released or disengaged position. The lever arm assembly 58 can then be returned to a rest position (FIGS. 4 and 5) by reversing the process discussed above. Similarly, the outer lever arm 154 can be returned to the stowed position 270 by reversing the process discussed above.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A park release apparatus for manually shifting a shift-by-wire automatic transmission of a vehicle, the park release apparatus comprising:
   a base;
   a variable length lever assembly pivotably coupled to the base and including first and second lever arms slidably coupled to each other, the second lever arm including first and second lock engagement positions;

a coupling member connected at a first end to the variable length lever assembly and adapted to be coupled at a second end to a shift lever of the transmission; and a lock arrangement associated with the variable length lever assembly, the lock arrangement including a lock member and a biasing member and configured to provide for selective movement of the first lever arm relative to the second lever arm between a stowed position where the variable length lever assembly has a first length and a deployed position where the variable length lever assembly has a second length greater than the first length, the lock arrangement configured to selectively maintain the first lever arm in the stowed and deployed positions;

wherein the lock member is biased into engagement with the second lock engagement position when the first lever arm is in the stowed position and with the first lock engagement position when the first lever arm is extended to the deployed position;

wherein actuation of the variable length lever assembly is adapted to move the shift lever to manually release a parking lock of the shift-by-wire transmission.

2. The park release apparatus of claim 1, wherein the first and second lever arms are telescopically arranged such that the first lever arm selectively slides relative to the second lever arm between the stowed position and the deployed position, the second lever arm being pivotably coupled to the base via a coupling.

3. The park release apparatus of claim 2, wherein actuation of the lever assembly includes applying a force to the first lever arm in the deployed position to pivotably rotate the first and second lever arms about the coupling to move the coupling member thereby moving the shift lever and manually releasing the parking lock.

4. The park release apparatus of claim 2, further comprising a pivot lock arrangement associated with the second lever arm and a pivot lock coupling surface associated with the base, the pivot lock arrangement configured to engage the pivot lock coupling surface to selectively maintain the variable length lever in one of a first position corresponding to the parking lock being engaged and a second position corresponding to the parking lock being manually released.

5. The park release apparatus of claim 4, wherein the lock arrangement is configured to be actuated to disengage the lock member from the second lock engagement position and, upon extending the first lever arm from the stowed position to the deployed position, automatically engage the first lock engagement position when the first lever arm is in the deployed position.

6. The park release apparatus of claim 5, wherein the first and second lock engagement positions include first and second apertures, and wherein the lock member includes a lock pin.

7. The park release apparatus of claim 6, wherein the pivot lock arrangement is associated with the second lever arm, the first aperture providing access to the pivot lock arrangement for actuation thereof when the first lever arm is in the stowed position.

8. The park release apparatus of claim 4, wherein the pivot lock arrangement is configured to be manually actuated to release the variable length lever assembly from the first position and to selectively maintain the variable length lever assembly in the second position.

9. The park release apparatus of claim 2, wherein the base is adapted to be secured to an interior component of a vehicle.

10. The park release apparatus of claim 9, wherein the base is positioned in a storage compartment of a center console of the vehicle and secured thereto.

\* \* \* \* \*